(12) United States Patent
Inaba et al.

(10) Patent No.: US 12,540,057 B2
(45) Date of Patent: Feb. 3, 2026

(54) ARTICLE TRANSPORT FACILITY

(71) Applicant: Daifuku Co., Ltd., Osaka (JP)

(72) Inventors: Katsuaki Inaba, Hinocho (JP); Tomonori Sumida, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 525 days.

(21) Appl. No.: 18/133,157

(22) Filed: Apr. 11, 2023

(65) Prior Publication Data

US 2023/0322527 A1 Oct. 12, 2023

(30) Foreign Application Priority Data

Apr. 12, 2022 (JP) .................................. 2022-065789

(51) Int. Cl.
| | |
|---|---|
| G06F 7/00 | (2006.01) |
| B65G 1/04 | (2006.01) |
| B66C 13/40 | (2006.01) |
| B66C 19/00 | (2006.01) |

(52) U.S. Cl.
CPC ............... B66C 13/40 (2013.01); B65G 1/04 (2013.01); B66C 19/00 (2013.01)

(58) Field of Classification Search
CPC ......... B66C 13/40; B66C 19/00; B66C 13/44; B66C 13/46; B65G 1/04; B65G 35/00; B65G 43/00; B65G 1/1378; B65G 1/0457; B65G 1/0471; G08C 15/00; G08C 15/02; G08C 17/00; G08C 19/00; G08C 19/36; G08C 23/00; G08C 2201/91; G08C 2201/93

USPC .................................. 700/213–215; 701/1–2
See application file for complete search history.

(56) References Cited

U.S. PATENT DOCUMENTS

2010/0283917 A1* 11/2010 Ueno ............... H04N 21/42204
348/734
2020/0012274 A1 1/2020 Kamiya et al.

FOREIGN PATENT DOCUMENTS

| JP | 564316 A | 3/1993 |
|---|---|---|
| JP | 6131590 A | 5/1994 |
| JP | 3040144 U | 5/1997 |
| JP | 2000103332 A * | 4/2000 |
| JP | 2018123000 A | 8/2018 |
| JP | 20205167 A | 1/2020 |

* cited by examiner

Primary Examiner — Yolanda R Cumbess
(74) Attorney, Agent, or Firm — The Webb Law Firm

(57) ABSTRACT

Provided is an article transportation facility including a plurality of article transportation vehicles and an operation terminal for controlling the article transportation vehicles, in which each of the article transportation vehicles includes a vehicle transmission/reception section for transmitting and receiving signals for communicating with the operation terminal. The operation terminal includes an operation section operated by a user, a terminal transmission/reception section that transmits and receives signals to and from the vehicle transmission/reception section, an extensible section that can extend and retract the distance between the operation section and the terminal transmission/reception section, and a setting changing section that changes a setting of at least one of a signal transmission strength and a reception sensitivity of the terminal transmission/reception section.

7 Claims, 4 Drawing Sheets

ARTICLE TRANSPORT FACILITY

CROSS-REFERENCE TO RELATED APPLICATION

This application claims priority to Japanese Patent Application No. 2022-065789 filed Apr. 12, 2022, the disclosure of which is hereby incorporated by reference in its entirety.

BACKGROUND OF THE INVENTION

1. Field of the Invention

The present invention relates to an article transport facility including an operation terminal.

2. Description of the Related Art

An example of an article transport facility including an operation terminal is disclosed in JP H05-064316A (Patent Document 1). The article transport facility of Patent Document 1 includes an operation terminal (handy terminal) that is carried by a user and controls an article transport vehicle by transmitting a signal corresponding to an operation performed by the user to the article transport vehicle.

However, in the article transport facility as in Patent Document 1, if there is an obstacle that hinders communication between the user operating the operation terminal and the article transport vehicle, communication between the operation terminal and the article transport vehicle becomes difficult, or the user will need to move a lot in order to communicate in some cases. Also, if there are a plurality of transport vehicles and communication is performed from the operation terminal side without specifying the vehicle identification information (machine number) that identifies each transport vehicle, there are cases where the target transport vehicle needs to receive the signal from the operation terminal without another untargeted transport vehicle receiving the signal from the operation terminal.

SUMMARY OF THE INVENTION

In view of the above, it is desirable to realize an article transport facility that facilitates appropriate communication even when there is an obstacle that hinders signal transmission or reception between the user and the article transport vehicle.

The article transport equipment according to the present disclosure is an article transport facility including: a plurality of article transport vehicles configured to travel along a predetermined travel route; and an operation terminal configured to be carried by a user and to control the article transport vehicles by transmitting a signal corresponding to an operation performed by the user to the article transport vehicles, in which each of the article transport vehicles includes a vehicle body, and a vehicle transmission/reception section provided on the vehicle body and configured to transmit and receive a signal for communicating with the operation terminal, the operation terminal includes: an operation section configured to be operated by the user; a terminal transmission/reception section configured to perform transmission and reception of a signal with the vehicle transmission/reception section; and an extensible section connecting the operation section and the terminal transmission/reception section and configured to extend and contract a distance between the operation section and the terminal transmission/reception section, and the operation terminal further includes a setting changing section configured to change a setting of at least one of a signal transmission strength and a reception sensitivity of the terminal transmission/reception section.

According to this configuration, by extending the extensible section, it is possible to perform signal transmission/reception with the terminal transmission/reception section brought closer to the vehicle transmission/reception section of the article transport vehicle relative to the operation section. Accordingly, even if there is an obstacle between the user and the article transport vehicle that hinders signal transmission/reception, communication can be performed appropriately. Also, since the setting of at least one of the signal transmission strength and the reception sensitivity of the terminal transmission/reception section can be changed according to the arrangement of obstacles and the intra-vehicle distance when a plurality of article transport vehicles are lined up along the travel route, it is possible to avoid erroneously operating an article transport vehicle other than the target article transport vehicle, and the possibility of erroneously receiving a signal from another article transport vehicle can be reduced also when the terminal transmission/reception section receives a signal from the vehicle transmission/reception section of the target article transport vehicle.

Further features and advantages of the technique according to the present disclosure will become clearer from the following description of exemplary and non-limiting embodiments described with reference to the drawings.

DESCRIPTION OF THE INVENTION

Figure 1:
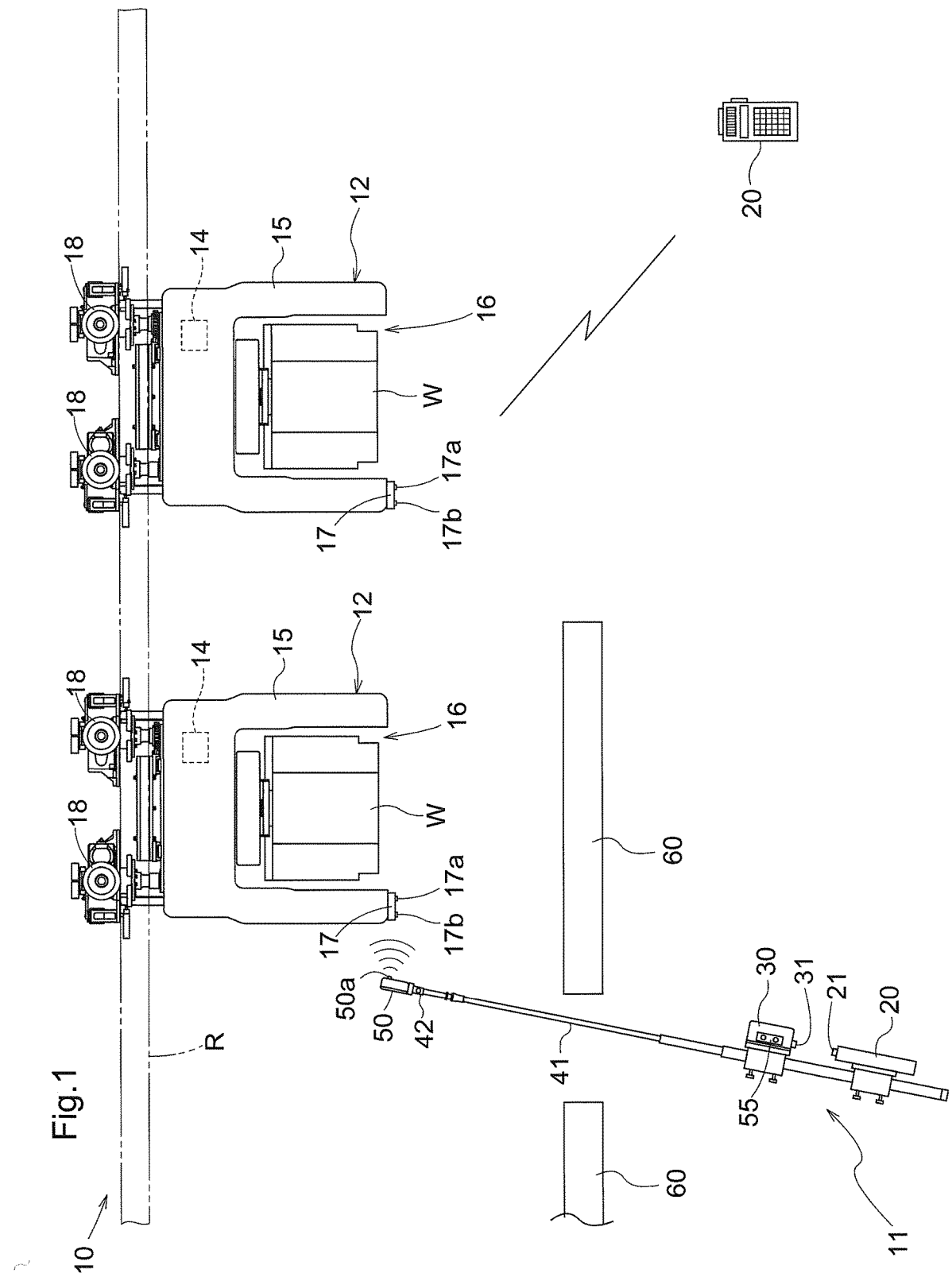
FIG. 1 is a diagram showing an article transport facility.

An embodiment of the article transport facility 10 will be described based on the drawings. FIG. 1 is a schematic diagram of an article transport facility 10. The article transport facility 10 includes an operation terminal 11 and a plurality of article transport vehicles 12. A plurality of article transport vehicles 12 travel along a prescribed travel route R. The operation terminal 11 is carried by a user and controls the article transport vehicle 12 by transmitting a signal corresponding to the operation performed by the user to the article transport vehicle 12. The article transport vehicle 12 includes a vehicle body 15 and a vehicle transmission and reception section (vehicle transmission/reception section) 17 that is provided in the vehicle body 15 and transmits and receives signals for communicating with the operation terminal 11. In the illustrated example, the vehicle transmission/reception section 17 includes a vehicle transmission section 17a and a vehicle reception section 17b.

In this embodiment, the article transport vehicle 12 includes a control device 14 that controls the operation of the article transport vehicle 12. The control device 14 is capable of controlling the operation of the article transport vehicle 12 based on a signal corresponding to a user operation received by the vehicle transmission/reception section 17 from the operation terminal 11, that is, a command from the operation terminal 11. Also, in this embodiment, the control mode of the article transport vehicle 12 controlled by the control device 14 can be switched between a first mode (automatic mode) in which the article transport vehicle 12 is controlled based on a command from a management device (not shown), and a second mode (manual mode) in which the article transport vehicle 12 is controlled based on a command from the operation terminal 11. The control mode of the article transport vehicle 12 is basically set to a first mode, and for example, when a failure or abnormality of the article transport vehicle 12 is detected, the control mode of the article transport vehicle 12 is switched to the second mode. Examples of operations of the article transport vehicle 12 controlled by the control device 14 include a traveling operation of traveling along the travel route R, a transfer operation of transferring the article W transported by the article transport vehicle 12, and an elevation operation of lifting or lowering the article W.

In this embodiment, the article transport vehicle 12 is a ceiling transport vehicle that travels along a travel route R installed on a ceiling. In addition, an article storage section 60 in which an article W is stored is installed along the travel route R in the article transport facility 10. In the illustrated example, the article transport vehicle 12 is an unmanned transport vehicle that includes a travel section 18 and a storage section 16 that stores articles W. Also, in the illustrated example, a receiving and delivering section for the articles W, such as a storing device and a processing device, is installed as the article storage section 60 below the travel route R. This article storage section 60 is an obstacle that hinders transmission and reception of signals between the user and the article transport vehicle 12. As the article storage section 60, a buffer or the like on which the article W is temporarily placed may also be installed. When the article transport vehicle 12 is a ceiling transport vehicle in this manner, the distance between the user and the article transport vehicle 12 tends to increase. Also, although not shown, if a fence or the like for ensuring a safe distance is provided to partition the travel area of the article transport vehicle 12, the distance between the user and the article transport vehicle 12 tends to increase. In this manner, although there are cases where there are obstacles that hinder transmission and reception of signals between the user and the article carrier 12, or the distance between the user and the article carrier 12 is long, by providing an expansible section 41 to be described hereinafter in the operation terminal 11, it is possible to properly transmit and receive signals between the operation terminal 11 and the article transport vehicle 12.

Figure 2:
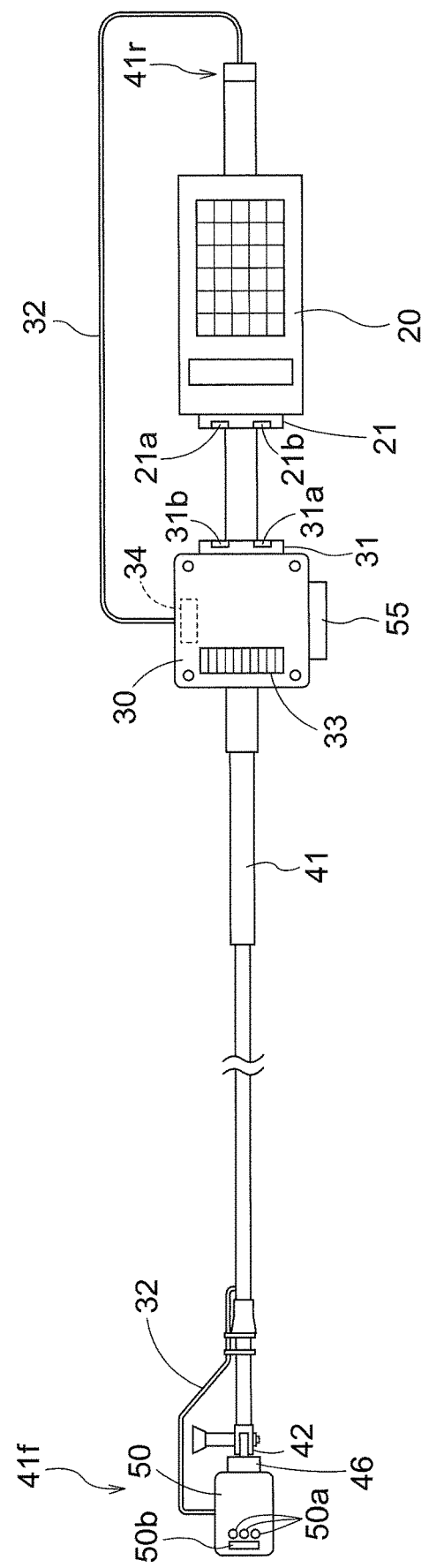
FIG. 2 is a front view of an operation terminal of FIG. 1.
Figure 3:
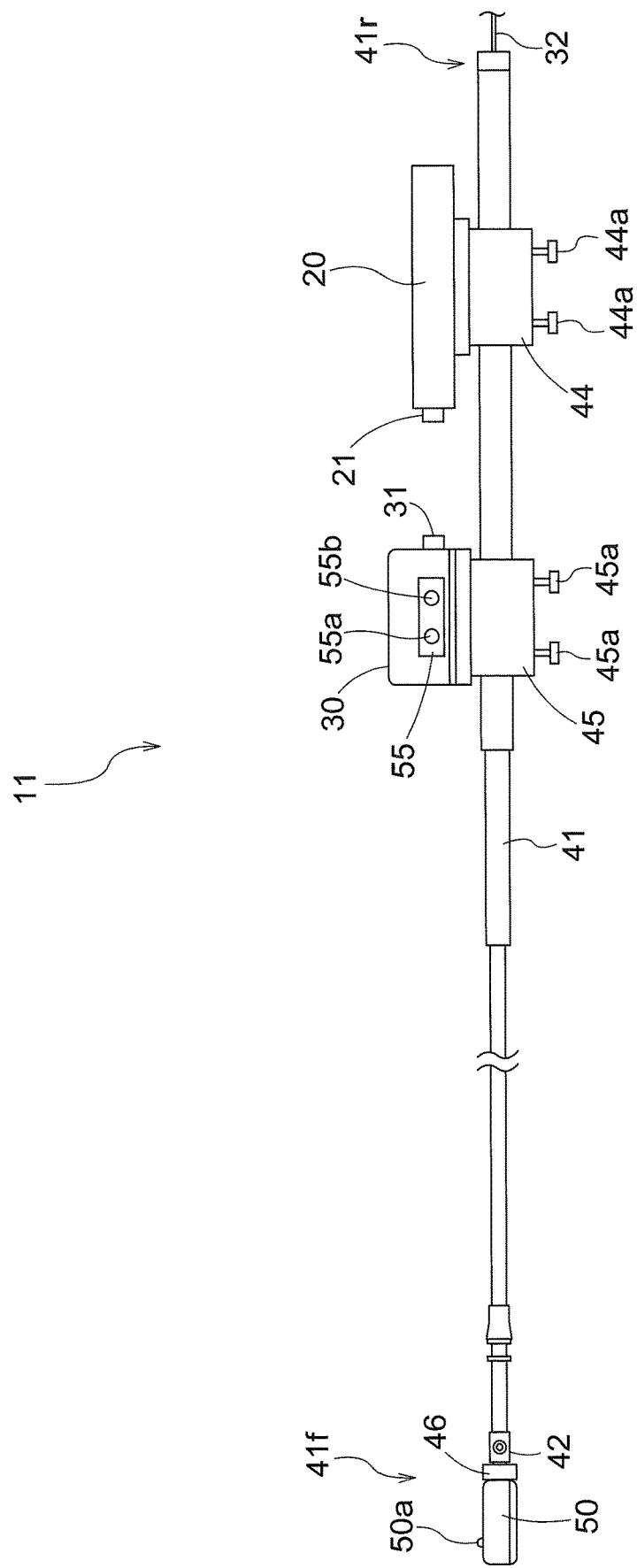
FIG. 3 is a side view of the operation terminal of FIG. 1.

FIG. 2 is a front view of the operation terminal 11, and FIG. 3 is a side view of the operation terminal 11. The operation terminal 11 includes an operation section 20 operated by a user, a terminal transmission and reception section (a terminal transmission/reception section) 50 that transmits and receives signals to and from the vehicle transmission/reception section 17, and an extensible section 41 connecting the operation section 20 and the terminal transmission/reception section 50. The extensible section 41 can extend and contract the distance between the operation section 20 and the terminal transmission/reception section 50. In the example shown in FIG. 2, the terminal transmission/reception section 50 includes a terminal transmission section 50a and a terminal reception section 50b.

In this embodiment, the signals transmitted and received between the terminal transmission/reception section 50 and the vehicle transmission/reception section 17 are signals for optical communication. A signal for optical communication is a signal for so-called optical wireless communication, and is, for example, a signal for visible light communication or infrared communication. Signals for infrared communication are preferably used. More preferably, signals for near-infrared communication are used.

In this embodiment, the operation section 20 includes a first transmission and reception unit (a first transmission/reception unit) 21. The first transmission/reception unit 21 can transmit and receive signals to and from the vehicle transmission/reception section 17. Also, in the present embodiment, the operation section 20 is attachable to and detachable from the extensible section 41. This makes it possible for the user to remove only the operation section 20 from the operation terminal 11 and operate the article transport vehicle 12. In the example shown in FIG. 2, the first transmission/reception unit 21 includes a first unit transmission section 21a and a first unit reception section 21b. Also, the operation section 20 has a built-in storage battery, which is charged as appropriate.

In this embodiment, the operation terminal 11 further includes a signal relay section 30. The signal relay section 30 has a second transmission and reception unit (a second transmission/reception unit) 31. The second transmission/reception unit 31 can transmit and receive signals to and from the first transmission/reception unit 21. That is, the first transmission/reception unit 21 can transmit and receive signals to and from the second transmission/reception unit 31 and can also transmit and receive signals to and from the vehicle transmission/reception section 17. Preferably, the signal relay section 30 includes a photovoltaic panel 33 and a capacitor 34, as shown in FIG. 2. This eliminates the need for battery replacement in the signal relay section 30. Also, the capacitor 34 supplies power to the terminal transmission/reception section 50 from a later-described connection section 32. This eliminates the need to replace the battery in the terminal transmission/reception section 50. Also, the photovoltaic panel 33 and the capacitor 34 may be provided in the terminal transmission/reception section 50, and power may be supplied to the signal relay section 30 from the later-described connection section 32. Note that a storage battery may be provided instead of the capacitor 34. Here, the "photovoltaic panel" is a device that converts light energy such as sunlight or illumination into electric energy, and is, for example, a solar cell.

Preferably, signals transmitted and received between the first transmission/reception unit 21 and the vehicle transmission/reception section 17 and signals transmitted and received between the first transmission/reception unit 21 and the second transmission/reception unit 31 are the same optical communication signals as the signals transmitted and received between the terminal transmission/reception section 50 and the vehicle transmission/reception section 17. In this embodiment, the second transmission/reception unit 31 is configured to be attachable to and detachable from the extensible section 41. In the example shown in FIG. 2, the second transmission/reception unit 31 includes a second unit transmission section 31a and a second unit reception section 31b.

In this embodiment, the signal relay section 30 further includes a connection section 32 that connects the second transmission/reception unit 31 and the terminal transmission/reception section 50 so as to allow signal transmission. A conductive wire, an optical cable, a radio, or the like may also be used for the connection section 32. In the illustrated example, the connection section 32 is a conductive wire that transmits electrical signals, and supplies power from the second transmission/reception unit 31 to the terminal transmission/reception section 50. In the illustrated example, the extensible section 41 is composed of a plurality of tubular members with different diameters, and is shortened in the longitudinal direction by pulling the tubular members with smaller diameters into the tubular members with larger diameters. Here, the user-side end portion of the extensible section 41 is referred to as a rear end 41r, and the article transport vehicle 12-side end portion is referred to as a leading end 41f. The connection section 32, which is a signal line, is passed through the inside of the cylindrical extensible section 41 from the rear end 41r to the leading end 41f of the extensible section 41, and connects the second transmission/reception unit 31 arranged toward the rear end 41r and the terminal transmission/reception section 50 arranged toward the leading end 41f to each other.

Figure 4:
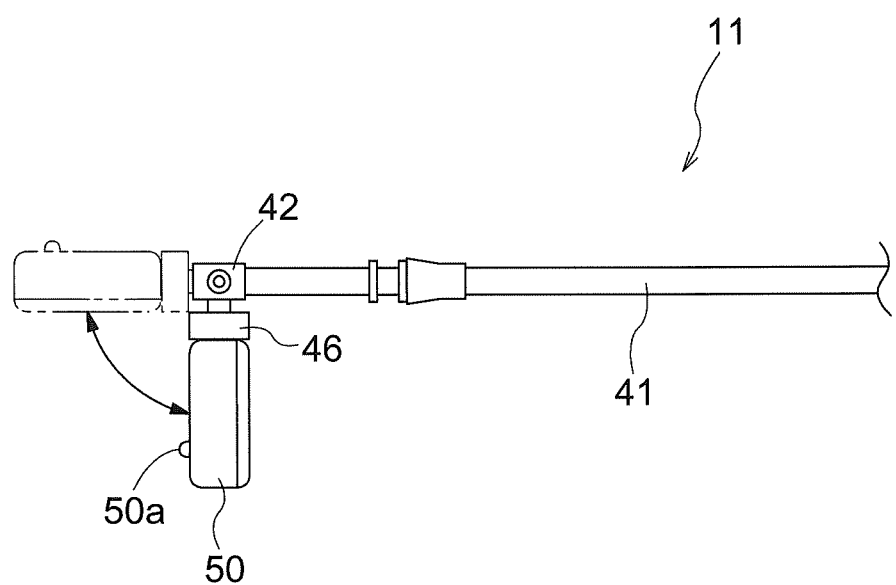
FIG. 4 is an enlarged view showing an angle adjustment mechanism of the operation terminal of FIG. 1.

As shown in FIG. 4, in the present embodiment, a coupling portion between the terminal transmission/reception section 50 and the extensible section 41 is provided with an angle adjustment mechanism 42 that can change the angle of the terminal transmission/reception section 50 relative to the extensible section 41. For this reason, the orientation of the terminal transmission/reception section 50 can be adjusted as appropriate to an orientation suitable for transmitting and receiving signals to and from the article transport vehicle 12. Accordingly, for example, even if there is an obstacle in the surrounding area of the article transport vehicle 12, it is easy to transmit and receive signals to and from the vehicle transmission/reception section 17 while avoiding the obstacle. Preferably, the angle adjustment mechanism 42 can rotate the angle of the terminal transmission/reception section 50 from 0 degrees to 90 degrees with respect to the direction of extension/contraction of the extensible section 41.

In this embodiment, the terminal transmission/reception section 50 is attachable to and detachable from the extensible section 41. In the example shown in FIG. 3, the extensible section 41 includes an operation section fixing section 44, a signal relay section fixing section 45, and a terminal transmission and reception section fixing section 46. The operation section fixing section 44 is fixed to the extensible section 41 by bolts 44a, and supports the operation section 20 by detachable metal fittings or the like. The signal relay section fixing section 45 is fixed to the extensible section 41 with bolts 45a, and supports the signal relay portion 30 with detachable metal fittings or the like. The terminal transmission/reception section fixing section 46 is fixed to the leading end 41f of the extensible section 41, and supports the terminal transmission/reception section 50 with a detachable metal fitting or the like. Accordingly, the operation section 20, the second transmission/reception unit 31, and the terminal transmission/reception section 50 are respectively attachable/detachable to/from the extensible section 41.

In this embodiment, the operation terminal 11 can transmit a vehicle identification information inquiry signal to the article transport vehicle 12 from the terminal transmission/reception section 50, and when the inquiry signal from the operation terminal 11 is received by the vehicle transmission/reception section 17, the article transport vehicle 12 transmits the vehicle identification information from the vehicle transmission/reception section 17. In this way, the user operating the operation terminal 11 can operate the article transport vehicle 12 after confirming the vehicle identification information of the article transport vehicle 12. Accordingly, it is possible to avoid erroneously operating another article transport vehicle 12. The vehicle identification information is information for identifying an individual article transport vehicle 12, and is, for example, a machine number, which is a unique number assigned to each article transport vehicle 12.

Preferably, the signal transmission strength of the vehicle transmission/reception section 17 is set such that the signal transmission distance of the vehicle transmitter-receiver 17 is smaller than the minimum distance between the adjacent article transport vehicles 12. This makes it easy to avoid receiving signals such as vehicle identification information from the vehicle transmission/reception sections 17 of a plurality of article transport vehicles 12. It should be noted that the minimum distance between the article transport vehicles 12 is the distance between article transport vehicles 12 determined in advance in order to prevent contact or the like between the article transport vehicles 12 when the article transport vehicles 12 are controlled in the first mode (automatic mode).

Since the operation terminal 11 has the extensible section 41, by extending the extensible section 41, the operation terminal 11 can transmit signals, receive signals, or transmit and receive signals with the terminal transmission/reception section 50 brought closer to the vehicle transmission/reception section 17 of the article transport vehicle 12 relative to the operation section 20. Accordingly, even if there is an obstacle hindering transmission and reception of signals between the user and the article transport vehicle 12, communication can be performed appropriately. Also, the operation terminal 11 includes a setting changing section 55 that changes the setting of at least one of the signal transmission strength and the reception sensitivity of the terminal transmission/reception section 50. As a result, the setting of at least the signal transmission strength and the reception sensitivity of the terminal transmission/reception section 50 can be adjusted according to the arrangement of obstacles and the inter-vehicle distance when a plurality of article transport vehicles 12 are lined up along the travel route R, and therefore it is possible to avoid erroneously operating an article transport vehicle 12 other than the target article transport vehicle 12. Also, even when the terminal transmission/reception section 50 receives the signal from the vehicle transmission/reception section 17 of the target article transport vehicle 12, the likelihood of erroneously receiving the signal from another article transport vehicle 12 can be reduced.

In this embodiment, the setting changing section 55 is provided in the signal relay section 30. In the example shown in FIG. 2, the setting changing section 55 includes both a transmission strength changing section 55a that changes the setting of the signal transmission strength of the terminal transmission/reception section 50, and a reception sensitivity change section 55b that changes the setting of the reception sensitivity of the terminal transmission/reception section 50.

Also, in the present embodiment, the setting change section 55 can change the signal transmission strength of the terminal transmission/reception section 50 continuously or in a stepwise manner. In this way, when a signal corresponding to a user operation is transmitted from the terminal transmission/reception section 50 to the article transport vehicle 12, for example, the setting change section 55 raises the signal transmission strength from a low value to a high value continuously or in a stepwise manner and stops the raising of the signal transmission strength when the signal corresponding to the user operation reaches the nearest article transport vehicle 12, and thereby, it is possible to avoid transmission of the signal to an article transport vehicle 12 other than the nearest article transport vehicle 12. Also, for example, the setting change portion 55 can adjust the signal strength while lowering the signal transmission strength from a high value to a low value continuously or in a stepwise manner. This makes it possible to avoid erroneously operating an article transport vehicle 12 other than the target article transport vehicle 12. When changing the signal transmission intensity in a stepwise manner, it is desirable to be able to change in at least three steps.

Also, in this embodiment, the setting change section 55 can change the reception sensitivity of the terminal transmission/reception section 50 continuously or in a stepwise manner. In this manner, when the terminal transmission/reception section 50 receives a signal from the vehicle transmission/reception section 17 of the article transport vehicle 12, for example, the setting change section 55 raises the setting of the reception sensitivity from a low value to a high value continuously or in a stepwise manner and stops the raising of the reception sensitivity when the signal from the nearest article transport vehicle 12 is received, and thereby it is possible to avoid receiving the signal from an article transport vehicle 12 other than the nearest article carrier 12. Also, for example, the setting change section 55 can adjust the reception sensitivity while lowering the reception sensitivity from a high value to a low value continuously or in a stepwise manner. This makes it possible to avoid receiving signals from a plurality of article transport vehicles 12. When changing the reception sensitivity in a stepwise manner, it is desirable to be able to change in at least three steps.

Other Embodiments

Next, another embodiment of the article transport facility 10 will be described.

(1) In the above embodiment, a configuration in which the article transport vehicle 12 is a ceiling transport vehicle that travels along the travel route R installed on the ceiling was described as an example. However, there is no limitation to such a configuration, and for example, the article transport vehicle 12 may also be an unmanned transport vehicle that travels on a floor surface.

(2) In the above embodiment, a configuration was described as an example, in which the signal transmitted and received between the terminal transmission/reception section 50 and the vehicle transmission/reception section 17 is a signal for optical communication. However, there is no limitation to such a configuration, and for example, the signal may also be a signal for wireless communication using radio waves. The same applies to the signals transmitted and received between the first transmission/reception unit 21 and the vehicle transmission/reception section 17 and the signals transmitted and received between the first transmission/reception unit 21 and the second transmission/reception unit 31 are the same.

(3) In the above embodiment, an example was described in which the extensible section 41 is made of a plurality of tubular members having different diameters. However, there is no limitation to such a configuration, and for example, the extensible section 41 is contracted by folding a plurality of rods or tubular members.

(4) Also, in the above embodiment, a configuration in which the operation section 20, the second transmission/reception unit 31, and the terminal transmission/reception section 50 are each attachable to and detachable from the extensible section 41 was described as an example. However, there is no limitation to such a configuration, and the operation section 20 may also be fixed to the extensible section 41 so as not to be separable therefrom. Also, the second transmission/reception unit 31 and the terminal transmission/reception section 50 may be fixed to the extensible section 41 so as not to be separable therefrom. Also, the operation terminal 11 does not need to include the angle adjustment mechanism 42.

(5) Also, in the above embodiment, a configuration in which the operation terminal 11 includes the setting changing section 55 for changing the setting of the signal transmission strength and the reception sensitivity of the terminal transmission/reception section 50 was described as an example. However, there is no limitation to such a configuration, and for example, the operation terminal 11 may also include a setting changing section 55 that changes the setting of only one of the signal transmission strength and the reception sensitivity of the terminal transmission/reception section 50. Also, the operation terminal 11 may not transmit an inquiry signal for the vehicle identification information. Also, the vehicle transmission/reception section 17 may not transmit the vehicle identification information.

(6) Also, in the above embodiment, a configuration in which the operation section 20 includes the first transmission/reception unit 21 that can transmit and receive signals to and from the second transmission/reception unit 31 of the signal relay section 30 and can transmit and receive signals to and from the vehicle transmission/reception section 17 as well, was described as an example. However, there is no limitation to such a configuration, and for example, the first transmission/reception unit 21 need not be able to transmit and receive signals to and from the vehicle transmission/reception section 17. Also, the operation section 20 does not need to include the first transmission/reception unit 21, and the operation section 20 and the terminal transmission/reception section 50 may be connected to each other without using the signal relay section 30, such that signals can be transmitted by wire.

(7) It should be noted that the configurations disclosed in the above-described embodiments can also be applied in combination with configurations disclosed in other embodiments as long as there is no contradiction. Regarding other configurations as well, the embodiments disclosed in this specification are merely examples in all respects. Accordingly, various modifications can be made as appropriate without departing from the gist of the present disclosure.

SUMMARY OF THE ABOVE EMBODIMENTS

The article transport facility 10 described above will be described below.

The article transport equipment according to the present disclosure is an article transport facility including: a plurality of article transport vehicles configured to travel along a predetermined travel route; and an operation terminal configured to be carried by a user and to control the article transport vehicles by transmitting a signal corresponding to an operation performed by the user to the article transport vehicles, in which each of the article transport vehicles includes a vehicle body, and a vehicle transmission/reception section provided on the vehicle body and configured to transmit and receive a signal for communicating with the operation terminal, the operation terminal includes: an operation section configured to be operated by the user; a terminal transmission/reception section configured to perform transmission and reception of a signal with the vehicle transmission/reception section; and an extensible section connecting the operation section and the terminal transmission/reception section and configured to extend and contract a distance between the operation section and the terminal transmission/reception section, and the operation terminal further includes a setting changing section configured to change a setting of at least one of a signal transmission strength and a reception sensitivity of the terminal transmission/reception section.

According to this configuration, by extending the extensible section, it is possible to perform signal transmission/reception with the terminal transmission/reception section brought closer to the vehicle transmission/reception section of the article transport vehicle relative to the operation section. Accordingly, even if there is an obstacle that hinders signal transmission/reception between the user and the article transport vehicle, communication can be performed appropriately. Also, since the setting of at least one of the signal transmission strength and the reception sensitivity of the terminal transmission/reception section can be changed according to the arrangement of obstacles and the intra-vehicle distance when a plurality of article transport vehicles are lined up along the travel route, it is possible to avoid erroneously operating an article transport vehicle other than the target article transport vehicle, and the likelihood of erroneously receiving a signal from another article transport vehicle can be reduced also when the terminal transmission/reception section receives a signal from the vehicle transmission/reception section of the target article transport vehicle.

Here, the operation terminal is further configured to transmit an inquiry signal for vehicle identification information from the terminal transmission/reception section to the article transport vehicles, and the article transport vehicles each transmit the vehicle identification information from the vehicle transmission/reception section in response to the vehicle transmission/reception section receiving the inquiry signal from the operation terminal.

According to this configuration, the user who operates the operation terminal can operate the article transport vehicle after confirming the vehicle identification information of the article transport vehicle. Accordingly, it is possible to avoid erroneously operating another article transport vehicle.

Also, the operation terminal further includes a signal relay section, the operation section includes a first transmission/reception unit and is attachable to and detachable from the extensible section, the signal relay section includes: a second transmission/reception unit; and a connection section configured to connect the second transmission/reception unit and the terminal transmission/reception section to enable signal transfer therebetween, and the first transmission/reception unit is configured to perform signal transmission and reception with the second transmission/reception unit, and perform signal transmission and reception with the vehicle transmission/reception section.

According to this configuration, it is also possible to remove only the operation section for use. Accordingly, if there is no need to separate the terminal transmission/reception section from the operation section using the extensible section to transmit and receive signals with the article transport vehicle, the user can carry only the operation section to operate the article transport vehicle.

Also, the second transmission/reception unit and the terminal transmission/reception section are each attachable to and detachable from the extensible section.

According to this configuration, even if the second transmission/reception unit or the terminal transmission/reception section fails, it can be easily replaced.

Also, a coupling portion between the terminal transmission/reception section and the extensible section is provided with an angle adjustment mechanism configured to change an angle of the terminal transmission/reception section relative to the extensible section.

According to this configuration, the orientation of the terminal transmission/reception section can be adjusted as appropriate to an orientation suitable for transmitting and receiving signals to and from the article transport vehicle. Accordingly, for example, even if there is an obstacle in the surrounding area of the article transport vehicle, it is easy to avoid the obstacle and transmit and receive signals to and from the vehicle transmission/reception section.

Also, the terminal transmission/reception section and the vehicle transmission/reception section perform communication with each other with use of an optical communication signal.

When transmitting/receiving optical communication signals as in this configuration, if there is an obstacle on a straight line connecting the terminal transmission/reception section and the vehicle transmission/reception section, signal transmission and reception may become difficult. However, by providing an extensible section that can extend and contract the distance between the operation section and the terminal transmission/reception section as described above, such an obstacle can be avoided and the terminal transmission/reception section and the vehicle transmission/reception section can be brought closer to each other for communication.

Also, each of the article transport vehicles is a ceiling transport vehicle configured to travel along the travel route provided on a ceiling, and the article transport facility further includes an article storage section disposed along the travel route and configured to store an article.

When the article storage section is installed along the travel route as in this configuration, depending on the position where the article transportation vehicle is stopped, the vehicle transmission/reception section of the article transportation vehicle may be hidden by the article storage section from the user on the floor surface, and transmission/reception of signals may not be possible. However, by providing an extensible section that can extend and contract the distance between the operation section and the terminal transmission/reception section as described above, such an obstacle can be avoided and the terminal transmission/reception section and the vehicle transmission/reception section can be brought closer to each other for communication.

INDUSTRIAL APPLICABILITY

The technique according to the present disclosure can be used for an article transport facility including an operation terminal.

What is claimed is:
1. An article transport facility, comprising:
   a plurality of article transport vehicles configured to travel along a predetermined travel route; and
   an operation terminal configured to be carried by a user and to control the article transport vehicles by transmitting a signal corresponding to an operation performed by the user to the article transport vehicles,
   wherein each of the article transport vehicles comprises:
      a vehicle body; and
      a vehicle transmission/reception section provided on the vehicle body and configured to transmit and receive a signal for communicating with the operation terminal,
   wherein the operation terminal comprises:
      an operation section configured to be operated by the user;

a terminal transmission/reception section configured to perform transmission and reception of a signal with the vehicle transmission/reception section; and an extensible section connecting the operation section and the terminal transmission/reception section and configured to extend and contract a distance between the operation section and the terminal transmission/reception section, and wherein the operation terminal further comprises a setting changing section configured to change a setting of at least one of a signal transmission strength and a reception sensitivity of the terminal transmission/reception section.

2. The article transport facility according to claim 1, wherein the operation terminal is further configured to transmit an inquiry signal for vehicle identification information from the terminal transmission/reception section to the article transport vehicles, and wherein the article transport vehicles each transmit the vehicle identification information from the vehicle transmission/reception section in response to the vehicle transmission/reception section receiving the inquiry signal from the operation terminal.

3. The article transport facility according to claim 1, wherein:

the operation terminal further comprises a signal relay section, the operation section comprises a first transmission/reception unit and is attachable to and detachable from the extensible section, the signal relay section comprises:

a second transmission/reception unit; and a connection section configured to connect the second transmission/reception unit and the terminal transmission/reception section to enable signal transmission therebetween, and the first transmission/reception unit is configured to perform signal transmission and reception with the second transmission/reception unit and perform signal transmission and reception with the vehicle transmission/reception section.

4. The article transport facility according to claim 3, wherein the second transmission/reception unit and the terminal transmission/reception section are each attachable to and detachable from the extensible section.

5. The article transport facility according to claim 1, wherein a coupling portion between the terminal transmission/reception section and the extensible section is provided with an angle adjustment mechanism configured to change an angle of the terminal transmission/reception section relative to the extensible section.

6. The article transport facility according to claim 1, wherein the terminal transmission/reception section and the vehicle transmission/reception section perform communication with each other with use of an optical communication signal.

7. The article transport facility according to claim 1, wherein each of the article transport vehicles is a ceiling transport vehicle configured to travel along the travel route provided on a ceiling, and wherein the article transport facility further comprises an article storage section disposed along the travel route and configured to store an article.

* * * * *